US012571205B2

(12) United States Patent
Balling et al.

(10) Patent No.: US 12,571,205 B2
(45) Date of Patent: Mar. 10, 2026

(54) GYPSUM-BASED ACOUSTIC PANEL

(71) Applicant: KNAUF GIPS KG, Iphofen (DE)

(72) Inventors: Christian Balling, Waldbüttelbrunn (DE); Michael Schneider, Rödelsee (DE)

(73) Assignee: KNAUF GIPS KG, Iphofen (DE)

( * ) Notice: Subject to any disclaimer, the term of this patent is extended or adjusted under 35 U.S.C. 154(b) by 163 days.

(21) Appl. No.: 18/560,597

(22) PCT Filed: Mar. 29, 2022

(86) PCT No.: PCT/EP2022/000033
§ 371 (c)(1),
(2) Date: Nov. 13, 2023

(87) PCT Pub. No.: WO2023/280432
PCT Pub. Date: Jan. 12, 2023

(65) Prior Publication Data
US 2024/0254759 A1     Aug. 1, 2024

(30) Foreign Application Priority Data

Jul. 7, 2021     (EP) ..................................... 21000179

(51) Int. Cl.
*E04B 1/86*          (2006.01)
*B32B 5/02*          (2006.01)
(Continued)

(52) U.S. Cl.
CPC ................ *E04B 1/86* (2013.01); *B32B 5/022* (2013.01); *B32B 5/18* (2013.01); *B32B 5/245* (2013.01);
(Continued)

(58) Field of Classification Search
CPC .. E04B 1/86; B32B 5/022; B32B 5/18; B32B 5/245; B32B 13/02; B32B 13/14;
(Continued)

(56) References Cited

U.S. PATENT DOCUMENTS 4,557,970 A * 12/1985 Holtrop ..................... B32B 5/32
                                                            428/317.1
6,789,645 B1 * 9/2004 Deblander ............ E04B 9/0464
                                                            181/290
(Continued)

FOREIGN PATENT DOCUMENTS

WO        2004083146 A2      9/2004
WO        2009074875 A1      6/2009
WO        2015172799 A1     11/2015

OTHER PUBLICATIONS

International Search Report and Written Opinion received for PCT/EP2022/000033, mailed Jul. 21, 2022.
(Continued)

*Primary Examiner* — Forrest M Phillips
(74) *Attorney, Agent, or Firm* — Greer, Burns & Crain, Ltd

(57)                    ABSTRACT

A gypsum-based acoustic panel wherein in the panel includes a core layer of foamed gypsum, face side and back side layers of non-woven encasing the core layer, and the panel has an $alpha_w$-value of between 0.4 and 0.7 and specific flow resistances of <15000 Pa s/m, methods for their preparation and their uses.

14 Claims, 5 Drawing Sheets

(51) Int. Cl.
| | |
|---|---|
| *B32B 5/18* | (2006.01) |
| *B32B 5/24* | (2006.01) |
| *B32B 13/02* | (2006.01) |
| *B32B 13/14* | (2006.01) |
| *C04B 28/14* | (2006.01) |

(52) U.S. Cl.
CPC .............. *B32B 13/02* (2013.01); *B32B 13/14* (2013.01); *C04B 28/14* (2013.01); *B32B 2250/03* (2013.01); *B32B 2266/049* (2016.11); *B32B 2266/104* (2016.11); *B32B 2307/102* (2013.01); *B32B 2307/718* (2013.01); *B32B 2307/7376* (2023.05); *B32B 2607/00* (2013.01)

(58) Field of Classification Search
CPC ........ B32B 2266/049; B32B 2266/104; B32B 2307/7376; B32B 2307/102; B32B 2307/718; B32B 2250/03; B32B 2607/00; C04B 28/14
See application file for complete search history.

(56) References Cited

U.S. PATENT DOCUMENTS

| | | | |
|---|---|---|---|
| 2008/0299413 A1 | 12/2008 | Song et al. | |
| 2017/0297297 A1* | 10/2017 | Queen | B32B 27/40 |
| 2020/0024845 A1* | 1/2020 | Hakuta | B32B 3/266 |
| 2020/0219475 A1* | 7/2020 | Hakuta | B32B 5/26 |
| 2021/0164691 A1* | 6/2021 | Sugawara | G10K 11/161 |

OTHER PUBLICATIONS

Olny, X., et al., "An indirect acoustical method for determining intrinsic parameter of porous materials," Poromechanics II, 2002, pp. 731-737.

* cited by examiner

GYPSUM-BASED ACOUSTIC PANEL

BACKGROUND

The present invention lies on the field of dry construction and relates to a gypsum-based acoustic panel having an $alpha_w$-value of between 0.4 and 0.7 and a specific flow resistance of <15000 Pa s/m.

It should be understood that this invention is not limited to the embodiments disclosed in this summary, or the description that follows, but is intended to cover modifications that are within the spirit and scope of the invention, as defined by the claims.

In the present application, including the claims, other than in the operating examples or where otherwise indicated, all numbers expressing quantities or characteristics are to be understood as being modified in all instances by the term "about". Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Acoustic panels are known and are used to form interior surfaces, such as ceiling tiles, wall panels, and other partitions (e.g., partitions between office cubicles), in commercial or residential buildings. The panels are generally planar in shape and include an acoustical layer containing a combination of materials selected to provide suitable acoustic absorbency while retaining sufficient durability. Some acoustical panels are designed to have set gypsum (i.e., calcium sulfate dihydrate) in the acoustical layer. Because set gypsum is not inherently a particularly acoustically absorbent material, many acoustical panels comprising set gypsum include mechanically-formed perforations e.g. large holes that may be, for example, drilled, punched, or otherwise formed to pass through the entire depth of the panel. These panels have shortcomings such as being not aesthetically pleasing, if a support grid or perforations are visible. There have been attempts to cover perforations while at the same time maintaining the acoustical performance, but these attempts have been costly and/or time consuming. There is a need for improvement and new developments for acoustic panels, such as e.g. acoustic panels without large perforations, but with sufficient strength/stability to be attached to a sub-structure via e.g. screws, thereby being aesthetically pleasing. Thus, there is always the possibility of improvement on the prior art and the panels according to the prior art still have shortcomings and difficulties that could be improved upon.

SUMMARY

It was an object of the present invention to provide an acoustically effective gypsum panel with closed surface.

"Closed" in this context means that the surface visually appears smooth and homogenous. However, in the context of this application, the word "closed" does not define any acoustic properties.

These panels should be suitable as alternatives to known perforated panels and be suitable for replacing the known ones.

The panels should have comparable properties, effectiveness and performance as those know in the art, especially provide good acoustic absorption properties, particularly a reduced reverberation time, with at the same time at least sufficient mechanical properties.

These objects and other objects that present themselves to the person skilled in the art upon regarding the present description and claims are solved by the subject matter outlined in the independent claims.

Particularly well-suited embodiments are given in the dependent claims as well as the following description.

In the present invention, the $alpha_w$-value is spelled out instead of using the Greek symbol for "alpha" in order to avoid conversion problems. The correct denotation would be to use the Greek symbol for "alpha". The $alpha_w$-value is a value representing the sound absorption rates according to DIN EN ISO 11654:1997.

In the present invention the term "gypsum" or "dihydrate" relates to $CaSO_4*2\ H_2O$.

In the present invention the term "hemihydrate" or "stucco" relates to $CaSO_4*0.5\ H_2O$.

In the present invention unless stated otherwise, temperatures are in degrees Celsius, and reactions and process steps are conducted under atmospheric pressure.

In the present invention, the term "acoustic panel" relates to panels that are designed to optimise acoustical properties, particularly to reduce the reverberation time.

DETAILED DESCRIPTION

Figure 1:
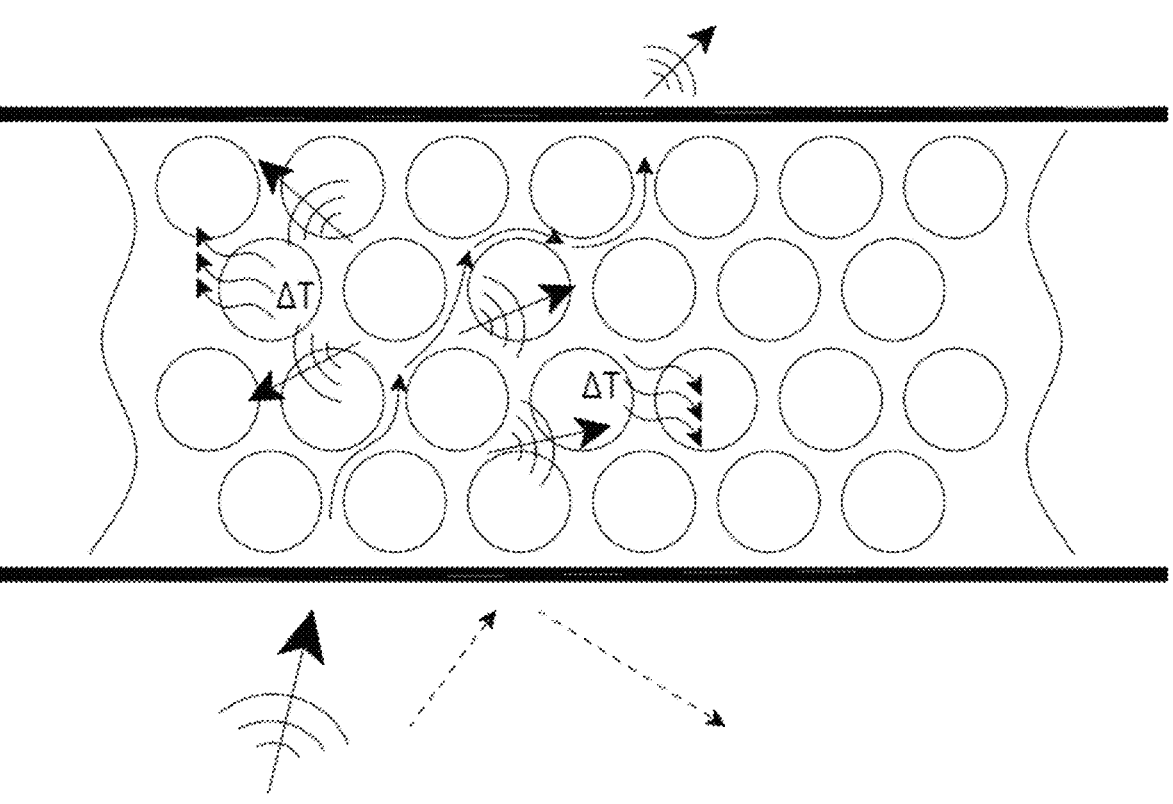
FIG. 1 shows a schematic cross-section of the present acoustic panel.

According to the present invention, the acoustic panels comprise a core layer of foamed gypsum and a covering or encasing of an acoustically transparent material, preferably a non-woven material. The core layer is preferably monolithic. A monolithic core layer is easier to produce than a non-monolithic core layer.

The acoustic panels according to the present invention achieve sound absorption rates of up to an alpha-W-value ($alpha_w$-value) of 0.6 corresponding to 60% sound absorption or even (higher absorbing) up to 0.7 and can be assigned to absorber class D ($alpha_w$=0.30 to 0.55) or C ($alpha_w$=0.60 to 0.75), all according to DIN EN ISO 11654:1997.

Preferred acoustic panels according to the present invention have $alpha_w$-values of 0.50 to 0.60.

The acoustic panels according to the present invention have specific flow resistances Rs of <15000 Pa s/m, which means that they can be called air-permeable for acoustical purposes. Preferably, they have specific flow resistances Rs of <13000 Pa s/m, according to DIN EN 29053:1993.

In preferred embodiments the acoustic panels according to the present invention have a low density, preferably of <450 kg/m³, more preferably between 300 and 380 kg/m³, in particular between 320 und 360 kg/m³ or between 340 and 360 kg/m³. In the context of the present invention, "density" is based on the volume including pores and cavities.

The core layer of the panels according to the present invention consists of irregularly arranged fine- or micro-pores that are connected with each other forming a network of a three-dimensional structure with channels and cavities.

The pore sizes are preferably in the range of 20 µm to 300 µm. The average pore size is preferably in the range of 50 µm to 200 µm, more preferably in the range of 50 µm to 150 µm. Typically, the pores are sharp-edged, meaning that they are typically not round- or oval-shaped.

In preferred embodiments, the core layer of the acoustic panels according to the present invention comprises pores within the range of 40 to 60% by volume.

In preferred embodiments, the acoustic panels according to the present invention have a square meter weight of <7.5 kg/m².

The panels according to the present invention preferably have thicknesses of between 12.5 mm±0.7 mm and 40.0 mm±0.7 mm. In particular, the panels according to the present invention achieve the abovementioned properties with a panel thickness of 20 mm±0.7 mm. Accordingly preferred acoustic panels according to the present invention have a thickness of 20 mm±0.7 mm. Other panel thicknesses are, however also possible and within the scope of the present invention.

The acoustic panel of the present invention can also be called an ultra-light-weight porous foamed gypsum panel.

This hemihydrate to be used as binder (in the core layer) of the acoustic panels according to the invention is preferably a hemihydrate from a synthetic gypsum source. Preferably, the hemihydrate is a mixture from at least two synthetic gypsum sources. Sources for synthetic gypsum may be: titanogypsum, citrogypsum, phosphogypsum and FGD gypsum, preferably titanogypsum, citrogypsum and FGD gypsum.

Preferably, titanogypsum, citrogypsum and FGD gypsum can be employed in ranges of 32 to 62% by weight of titanogypsum, 13 to 43% by weight of citrogypsum and 10 to 40% by weight of FGD gypsum, preferably 42 to 52% by weight of titanogypsum, 23 to 33% by weight of citrogypsum and 20 to 30% by weight of FGD gypsum, more preferably 44 to 50% by weight of titanogypsum, 25 to 31% by weight of citrogypsum and 22 to 28% by weight of FGD gypsum, the percentages being based on the entire hemihydrate mixture and adding up to 100%.

Most preferred is a hemihydrate composition from 47% by weight of titanogypsum, 28% by weight of citrogypsum and 25% by weight of FGD gypsum, the percentages being based on the entire hemihydrate mixture.

FGD gypsum is a gypsum that is obtained from flue gas desulfurization processes. The advantages of FGD gypsum plaster are, among others, high purity, uniform and fine particles size, light colour and no abrasive particles. Higher purity results in more set hydraulic binder per unit weight for generally improved strength over natural gypsum plaster of lower purity. The lack of abrasive particles causes less wear on conveying equipment and mixer parts.

Acid gypsum is a gypsum that is obtained as a by-product during the production of organic acids; citrogypsum is a by-product obtained during the production of citric acid.

Titanogypsum is a gypsum that is obtained during the production of titanium dioxide.

In general, synthetic gypsum has a smaller particle size distribution than natural gypsum. More uniform particles may have more uniform properties, making it easier to control e.g. the setting time. The particle size distribution of synthetic gypsum (as well as the resulting hemihydrate resulting therefrom) may e.g. be in the range of 10 to 200 µm. The hemihydrate particles from a synthetic gypsum source are less prone to disintegration in a mixer. This also leads to a reduced water demand of hemihydrate from a synthetic gypsum source, which in turn is advantageous for the production of foamed gypsum, particularly if the production involves a viscous slurry.

It is preferred according to the present invention if the employed gypsums/hemihydrates are as pure as possible, preferably the have a purity of at least 90% by weight, more preferably of at least 95% by weight, in particularly of at least 97% by weight. A high purity is preferred for a maximum formation of interlocking calcium sulphate dihydrate crystals. Impurities generally do not interlock, thereby reducing the overall strength of the calcium sulphate matrix. Impurities thus weaken e.g the flexural strength of a gypsum-based acoustic panel comprising a core layer of foamed gypsum. Moreover, impurities can give rise to uncontrolled reactions in the slurry and/or non-specified or unwanted properties in the panel.

It is to be understood that, while the above mentioned kinds of gypsum are most preferred for employment according to the present invention, in some variants of the present invention they may be substituted with other gypsum kinds of non-natural but synthetic (also technical) origin that have substantially the same properties as the respective kinds. Natural gypsum is not employed according to the present invention because of its lower purity resulting e.g. in higher water demand and higher destruction of pores.

The gypsum in the acoustic panels of the present invention may additionally contain an organic calcium salt, the salt preferably being from an organic acid, preferably an organic acid with at least two acid groups, more preferably being selected from oxalic acid or tartaric acid, in particular calcium tartrate, the organic salt being contained in the range of 0.20 to 0.30% by weight, preferably in the range of 0.23 to 0.27% by weight based on the entire amount of gypsum. Further, the gypsum in the acoustic panels of the present invention may additionally contain polyvinyl alcohol, in the range of 1.5 to 2.5% by weight, preferably in the range of 1.8 to 2.2% by weight based on the entire amount of gypsum.

In some embodiments it is possible that the gypsum contains fibres, particularly in an amount of 1.0 to 2.0% by weight in relation to amount of gypsum, preferred 1.5 to 2.0% by weight in relation to amount of gypsum. In this context in principle any fibres used in the art can be employed.

Also, the acoustic panels of the present invention additionally may contain fillers. Some examples for fillers known and used in the art, and useable herein, include fumed silica, fly ash, blast furnace slag, micro-silica, (expanded) perlite and clay. Expanded perlite reduces material density and clay enhances fire resistance of the acoustical panel.

In one preferred embodiment of the present invention, the acoustic panels contain fibres mixed into the gypsum but no fillers.

In some preferred variants of the present invention, fibres are present in the core layer, wherein the fibres are selected from the group consisting of glass fibres, carbon fibres, mineral fibres in particular basalt fibres, cellulose fibres, fibres or synthetic organic polymer fibres and mixtures thereof.

According to the present invention glass fibres are particularly preferred. Preferably chopped glass fibres are being employed and in particular ones having chopped strand lengths of between 5 mm and 15 mm. More preferably the glass fibres have filament diameters of between 13 μm and 17 μm.

One example for commercially available glass fibres that are particularly well suited for use in the context of the present invention and thus preferably employed, are Dura-Core® 300 from Johns Manville. Glass fibres as well as other fibres increase the strength of a panel, which is particularly advantageous if the panel comprises a core layer of foamed gypsum.

In some embodiments it is possible that the core layer contains additional binders. Examples of these additional binders used in acoustical panels may include starch, latex and/or reconstituted paper products, which link together and create a binding system that locks all of the ingredients into a structural matrix. Also, other commonly known resin binders may be added in some variants the present invention, like e.g. polyacrylics, fluoropolymers and combinations thereof.

In preferred embodiments, however, the panels of the present invention are free of such binders, wherein "free of" means, they contain less than 0.5% by weight, based on the entire gypsum.

In some preferred variants of the present invention, the gypsum of the acoustic panels according to the present invention does not contain any further additives and auxiliaries or their residues after production of the panel. This is intended to mean that in these variants no further additives or auxiliaries are added during production of the panels; impurities present in the gypsum varieties and stemming from their respective production processes are allowed, as long as they are within the usual amounts characteristic to the respective gypsum. This means that technical impurities accompanying e.g. polyvinyl alcohol and the tartaric acid, calcium carbonate (limestone) as well as residues thereof can be present.

In some other preferred variants of the present invention, in order to improve the mechanical properties of the panels according to the present invention it is possible to add further additives and auxiliaries to the gypsum during production of the panel.

Examples of additives and auxiliaries that can be added during production and which, or whose residues, are then present in the gypsum of the panels according to the present invention are the following:

finely ground calcium sulphate dihydrate, as an accelerator in an amount of 0.10 to 0.70% by weight, preferably 0.30 to 0.35% by weight based on the amount of hemihydrate, preferably HyCon® GYP 1789 L from BASF (Suspension of a finely ground dihydrate including a polyarylether, approx. 35% to 40% solids content with a particle size of the a finely ground dihydrate <10 μm)

styrene butadiene copolymers, non-migrating starches and/or starch derivatives, polyvinyl acetate, and optionally, further viscosity modifiers like for example polymers based on cellulose, polyalcohol, polyurethane, polyester, polyether, polyacrylics or co-polymers thereof, fluidizers or water-reducing agents or plasticizers, like polycarboxylate ethers, blocking agents or calcium sequestering agents, like sodium polyacrylate/aluminium sulphate or sodium phosphonate/zinc sulphate other additives and auxiliaries not specifically mentioned here but known in the art.

The material of the face and back side of the acoustic panels of the present invention is chosen to be acoustically transparent. While in principle any material that provides support for the gypsum (i.e. acoustical layer) could be used, such as paper, non-woven fiberglass scrims, woven fiberglass mats, other synthetic fibre mats such as polyester and combinations thereof. In preferred embodiments of the acoustic panels according to the present invention the core layer is encased within non-wovens, i.e., non-wovens are used as gypsum board cover sheets.

Preferably the non-woven is made of a polyester composite, which, in particular, is based on a blend of glass fibres and polyester fibres, wherein the polyester composite preferably has an air porosity (ISO 9237:1995 (100 Pa)) of between 700 and 900 l/m² s, preferred of between 710 and 890 l/m² s, more preferred of between 750 and 850 l/m² s and most preferred of 800 l/m² s. While not necessary, it is preferred if the non-woven also has an area weight of 100 g/m2±5 g/m².

It is possible to combine two (slightly) different non-wovens for the face side and the backside of the panel.

It should be noted that in the present invention the non-woven can cover or encase the core layer in several ways, preferably integrated into the core layer, usually achieved by applying the foamed slurry during production onto the non-woven of the face side (first cover sheet) and applying the back side non-woven (second cover sheet) during production onto (into) the back side while the foamed slurry is not (completely) set, or as a separate layer, optionally adhered to the core layer via an adhesive, usually achieved by applying the non-woven to the already set core layer.

In one preferred embodiment of the present invention, the acoustic panels of the present invention do not undergo a surface treatment or texturing, e.g. no hole-drilling or embossing steps. In this embodiment of the present invention, the acoustic panels consist of the core layer and the face side and back side cover sheets.

In another preferred embodiment, the panels of the present invention are modified. In this embodiment, for example the acoustic panels can be structured, e.g. by drilling or punching. This structure in one variant is a number of holes in a regular or non-regular distribution along the surface area of the modified side. Suitable examples for the structure are hole-patterns of 8/32 R, 10/32 R and 12/12 R (wherein the first number stands for the hole diameter, the second for the distance between holes and R means round hole), which are thus preferred in one variant. Other means of structuration are possible. In a further preferred continuation of this embodiment, the structured surface of the acoustic panels is covered with a further layer of non-woven, in particular the same non-woven as the original cover sheet, optionally via an adhesive. The acoustic panels of this embodiment of the present invention achieve alpha_w-values of up to 0.75.

The acoustic panels of the present invention can be totally encased within the non-woven or the non-woven can cover the face side and the back side of the panel, while the border sides are either all or some not covered. This can be due to the specific production of the panels or as desired.

Particularly preferred acoustic panels of the present invention have the following set of properties and features:

alpha$_w$-values of up to 0.6, in particular between 0.5 and 0.6, specific flow resistance of <15000 Pa s/m, more preferably <13000 Pa s/m, density of <450 kg/m$^3$, preferably between 320 und 360 kg/m$^3$ and in particular between 340 und 360 kg/m$^3$, the gypsum is encased with non-woven, preferably a non-woven of a polyester composite, a thickness of 20 mm±0.7 mm, a square meter weight of <7.5 kg/m$^2$, preferably between 6.5 and 7.1 kg/m$^2$ and in particular between 6.7 and 7.1 kg/m$^2$, the employed gypsums/hemihydrates have a purity of at least 90% by weight, preferably of at least 95% by weight, in particular of at least 97% by weight, an amount in the range of 1.5 to 2.5% by weight of polyvinyl alcohol based on the entire amount of employed gypsum, glass fibres, preferably chopped glass fibres, in particular ones having chopped strands lengths of between 5 mm and 15 mm and filament diameters of between 13 μm and 17 μm, the surface is preferably neither holed nor perforated, pore sizes of the core layer in the range of 20 μm to 300 μm, and the amount of pores is within the range of 40 to 60% by volume.

Accordingly, extremely preferred acoustic panels according to the present invention have the following set of properties and features:

alpha$_w$-values of between 0.5 and 0.6, specific flow resistance of <13000 Pa s/m, density of between 340 und 360 kg/m$^3$, the gypsum is encased with a non-woven of a polyester composite, a thickness of 20 mm±0.7 mm, a square meter weight of between 6.7 and 7.1 kg/m$^2$, the employed gypsums/hemihydrates have a purity of at least 97% by weight, an amount in the range of 1.8 to 2.2% by weight of polyvinyl alcohol based on the entire amount of employed hemihydrate, chopped glass fibres with strands lengths of between 5 mm and 15 mm and filament diameters of between 13 μm and 17 μm, the surface is preferably neither holed nor perforated, pore sizes of the core layer in the range of 20 μm to 300 μm, and the amount of pores is within the range of 40 to 60% by volume.

or alpha$_w$-values of between 0.55 and 0.6, specific flow resistance of <13000 Pa s/m, density of between 320 und 360 kg/m$^3$, the gypsum is encased with a non-woven of a polyester composite, a thickness of 20 mm+0.7 mm, a square meter weight of between 6.5 and 7.1 kg/m$^2$, the employed gypsums/hemihydrates have a purity of at least 97% by weight, an amount in the range of 1.9 to 2.1% by weight of polyvinyl alcohol based on the entire amount of employed hemihydrate, chopped glass fibres with strands lengths of between 5 mm and 15 mm and filament diameters of between 13 μm and 17 μm, the surface is preferably neither holed nor perforated, pore sizes of the core layer in the range of 20 μm to 300 μm, and the amount of pores is within the range of 40 to 60% by volume.

The present invention is also directed to processes for preparing acoustic panels, particularly acoustic panels as described above. The person skilled in the art knows that a synthetic gypsum is calcined to provide a hemihydrate, preferably a beta-hemihydrate, from a synthetic gypsum source.

The process according to the present invention is similar to the well-known continuous preparation processes for panels employing a conveyor belt system.

In this process the main component, i.e. the hemihydrate is mixed with functional additives, if applicable, and then with mixing water, which may contain further liquid components, in a mixer. The thus produced slurry is then applied to a first cover sheet (face side), a non-woven in the present invention, and covered with a second cover sheet (back side), also a non-woven in the present invention. After the setting of the gypsum, the "endless" strand is cut to sections of the desired dimensions (lengths). Then several of the resulting panels are moved through a furnace/drying device in order to evaporate excess water and thus dry the panels. After the drying of the panels, the panels can then be cut to the exact desired sizes, if necessary, stacked and packaged.

One specific feature of the process according to present invention is the addition of a specific active pore-building mixture.

According to the present invention, this active pore-building mixture comprises at least one organic acid, in particular tartaric acid, and a carbonate, preferably calcium carbonate, e.g. limestone. The ingredients of the active pore-building mixture react in an aqueous medium, thereby releasing a pore-forming gas, such as carbon dioxide. The pore-forming gas, which is released by a reaction between an organic acid and a carbonate, acts as blowing agent in the settable calcium sulphate binder system (beta-hemihydrate) and thereby facilitates the formation of suitable pores in the core layer.

The pores formed by the reaction and the channels and cavities resulting from the pore linkage and aggregation are fixed in the core layer by the setting system optionally with the aid of accelerators, particularly based on calcium sulphate dihydrate ($CaSO_4 \cdot 2\ H_2O$) basis, and auxiliaries.

The underlying chemistry can be explained by the following equation, which is exemplary in that it is directed to tartaric acid; however, similar equations would result from other employable organic acids:

$$CaCO_3 + C_4H_6O_6 \rightarrow Ca^{2+}C_4H_4O_6^{2-} + H_2O + CO_2$$

Calcium carbonate reacts with tartaric acid to calcium tartrate and water and carbon dioxide, the latter of which is gaseous, thus escaping and pushing the equilibrium entirely to the product side, so that as a result only calcium tartrate remains in the product (the water is removed upon drying later in the production process).

If desired, in order to accelerate the reaction, it is possible to add an educt in stoichiometric excess; usually the educt in stoichiometric excess is calcium carbonate (inter alia, it is the cheaper educt).

According to the present invention, it is preferred to employ tartaric acid as organic acid. While all forms of tartaric acid (e.g. enantiomers and racemate) can be employed, one form that has proven particularly efficient is the L-(+)-form of tartaric acid. It is thus preferred in the context of the present invention to employ the L(+)-configuration of tartaric acid.

According to the present invention, it is preferred to employ limestone, preferably limestone powder, as calcium carbonate due to its low cost. However, any other form of calcium carbonate, like analytical grade, can of course be used.

It is preferred however to employ calcium carbonate of particles sizes of below 100 µm, i.e. at least 98% of the particles are smaller than 100 µm (measured via laser granulometer).

According to the present invention, the organic acid and the calcium carbonate can be premixed and stored, however, care should be taken to avoid water (humidity).

In preferred embodiments of the present invention, the organic acid and the calcium carbonate can be premixed together with polyvinyl alcohol, however, care should be taken to avoid water (humidity).

In other embodiments of the present invention, the organic acid and the calcium carbonate are pre-mixed and added to the reaction mixture, i.e. the hemihydrate containing mixture, whereas the PVA is added separately to the reaction mixture.

According to the present invention a particularly preferred mixture of the active pore-building mixture and the PVA is composed of 70 to 90%, preferably 75 to 85%, more preferably 80%, by weight of polyvinyl alcohol (PVA), 6 to 14%, preferably 8 to 12%, more preferably 10%, by weight of organic acid, preferably tartaric acid, and 6 to 14%, preferably 8 to 12%, more preferably 10%, by weight of calcium carbonate, preferably limestone, the percentages adding up to 100% and being based on the entire mixture.

According to the present invention, 0.1 to 5.0% by weight, preferably 0.1 to 2.0% by weight, more preferably 0.2 to 0.3% by weight of an organic acid, preferably tartaric acid, and 0.1 to 10.0% by weight, preferably 0.1 to 5.0% by weight, more preferably 0.2 to 0.3% by weight of calcium carbonate, preferably limestone, are added, based on the entire amount of hemihydrate in each case.

According to the present invention, 0.1 to 10.0% by weight, preferably 0.5 to 5.0% by weight, more preferably 1.0 to 3.0% by weight, even more preferably 1.8 to 2.0% by weight of polyvinyl alcohol, are added, based on the entire amount of hemihydrate in each case.

The reaction of the active pore-building mixture starts in the mixer in which the hemihydrate slurry is formed from the individual components. As soon as the active pore-building mixture, which is added as a powder, comes into contact with the main water in the mixer, the generation of $CO_2$ is started, thereby foaming the slurry. $CO_2$ generation continues after the slurry leaves the mixer. This is evidenced by the slurry expanding on the short distance between mixer outlet and forming-table (i.e. from being deposited on the first cover sheet to the application of the second cover sheet), which is usually only a few metres distance in continuous production setup. Thus, the slurry can increase in volume after being discharged from the mixer.

Additionally, a surfactant-based foam can be dosed in order to reduce the square meter weight/the density and at the same time build further pores. Preferably, surfactant-based foam may be an alkyl ether sulphate or an alkyl sulphate or combinations thereof. However, also (traces of) fatty alcohol may be present in the surfactant-based foam.

Together with the surfactant foam employed in the production, an ultra-light-weight foamed slurry and a highly porous core layer is generated. This core layer is interspersed with channels and cavities.

As mentioned, the main reaction of the active pore-building mixture occurs between the contact of the mixture with the water in the mixer up to the extruder/forming-table. After that, the setting of the core layer already starts until the withdrawal of excess water in the dryer. During the setting the formed pores are fixed in the core, possibly with the aid of an added accelerator (based on a calcium sulphate dihydrate). The actual setting section starts after the forming-table and substantially continues to the end of the production line.

Depending on the actual conveyor belt system, this distance is about 250 to 360 metres and the passing of the distance differs in duration depending on the respective production speed.

In one variant of the process according to the present invention, it is preferred to simultaneously add calcium carbonate, particularly limestone, organic acid, particularly tartaric acid, and PVA as one mixture.

In one further preferred variant limestone, tartaric acid and PVA are mixed immediately before use.

According to the present invention, one specific process for preparing acoustic panels having an alpha$_w$-value of between 0.4 and 0.7 and a specific flow resistance of <15000 Pa s/m, preferably ones with a thickness of 20 mm+0.7 mm, particularly those of the present invention comprises of the following steps:

I) providing beta-hemihydrate from a synthetic gypsum source,

II) mixing the compound of I) with water to provide a slurry,

III) mixing an active pore-forming compound with the compound of I) or the slurry of II) and/or mixing a surfactant-based foam with the slurry of II) to provide a foamed slurry, IV) applying the resulting foamed slurry to a first cover sheet, preferably made of a non-woven, V) applying a second cover sheet, preferably made of a non-woven, to the foamed slurry opposite to the side of the first cover sheet, VI) drying the product of V) to obtain an acoustic panel.

Characterizing for this process according to the invention is on the one hand that the foamed slurry has a slump test of between 155 and 190 mm and slurry-litre weight of between 520 and 580 g/l, and on the other hand that during and after the application of the foam mixture slurry no distributor roller is used.

In order to compensate for the latter lack of distributor roller, in order to facilitate equal distribution of the slurry on the cover sheet with a minimum of pore destruction, the foamed slurry is distributed by vibration by e.g. vibrating wheels, vibrating rollers, or other mechanisms that cause the forming-table to vibrate.

The foamed slurry according to the present invention is viscous compared to the standard gypsum plasterboard production. This viscosity can be measured with a slump test, also in combination with a slurry-litre weight. In the production line, the viscosity can be evidenced by the shape of the discharged (or deposited) slurry. In a standard gypsum plasterboard production, the discharged slurry is rather fluid and immediately spreads after being deposited on a first cover sheet. If slurry is discharged from more than one outlet, all discharged slurry immediately merges easily into one slurry ribbon. According to the present invention, the discharged slurry will not spread without further mechanical aid. If discharged from more than one outlet, the deposited slurry will remain as separate strands until they are spread, i.e. distributed, by mechanical means. Ideally, the slurry is distributed by vibration only. Ideally, no distributor roller is used. At present, a distributor roller is considered a disadvantage in that it is likely to close off pores on the surface of the core layer.

The slump test is a special way of determining the viscosity of the foamed slurry, as conventional viscosity determination processes are not applicable. To that end, a part of the mixer slurry downstream of the mixer outlet or at the beginning of the forming-table is extracted with a plasterer's mug and filled into the conical brass-ring of the measuring apparatus (ring diameter (upper opening): 70 mm; ring diameter (bottom opening): 97 mm; ring height: 57 mm). Excess slurry is scraped off with a spatula and after a defined period of time (usually and for the purposes of this invention 10 seconds after extraction of the mixer slurry) the metal plate below the brass ring is removed. The slurry drops onto the glass plate below and spreads. Depending on the consistency/viscosity of the foamed slurry, the slurry "slump" has a rounded shape with different diameters. This slurry "slump" is measured crosswise (at a 90° angle) and the mean value is given in millimetres.

The more viscous i.e. the higher the viscosity of the slurry, the smaller the diameter, the less viscous i.e. the lower the viscosity of the slurry, the larger the diameter.

The drop distance of the slurry is set at 125 mm for the present invention.

The slurry-litre weight (Breilitergewicht in German) is a measure for the density of the foamed slurry. To determine this, a part of mixer slurry is extracted with a plasterer's mug a poured into a beaker with defined volume (usually and for the purposes of this invention a 500 ml beaker). Excess slurry is removed with a spatula and the weight of the foamed slurry is determined. The results are given in g/l.

According to the invention, a further specific process for preparing acoustic panels having an alpha$_w$-value of between 0.4 and 0.7 and a specific flow resistance of <15000 Pa s/m, particularly those of the present invention, comprises of essentially the same steps I) to VI) as the aforementioned process. However, in this second process according to the present invention, the foam generation is started i) before entering the mixer, preferably with aid of surfactant, in particular an anionic surfactant, ii) upon entering of dry components, preferably via a component screw, into the mixer, or iii) before entering the mixer and upon entering of dry components into the mixer.

In i) the foam may be generated in a separate foaming device, preferably by mechanical agitation. In ii) foam generation may start as the active pore-building mixture comes into contact with water. The foam is then generated by the formation and release of $CO_2$.

In still other embodiments of the present invention, there is provided still a further specific process for preparing acoustic panels, particularly those of the present invention, which comprises or consists of essentially the same steps I) to VI) as the aforementioned process and, at the same time is characterized by the foam slurry having has a slump test value of between 155 and 190 mm and slurry-litre weight of between 360 and 650 g/l, preferably of between 520 and 580 g/l, no distributor roller, distribution of the slurry by vibration, being used during and after the application of the foamed slurry, and the foam generation being started before entering the mixer, upon entering of dry components into the mixer, or before entering the mixer and upon entering of dry components into the mixer.

Still further, in the processes of the present invention it is possible to add an accelerator, particularly to the mixture resulting from step I or II preferably a calcium sulphate dihydrate, more preferably a finely ground calcium dehydrate, most preferably HyCon® GYP 1789 L from BASF.

Even further, in the processes of the present invention it is possible to add a surfactant-based foam to the slurry resulting from step II, preferably the surfactant-based foam anionic surfactant-based foam. Typically, the surfactant is foamed in a separate foaming device by e.g. shear mixing and thereby incorporating air bubbles in the mixture. The incorporation of other gases such as $CO_2$ or noble gases is also possible. The foamed surfactant can be added to the slurry in the mixer and/or after the mixer, but prior to depositing the slurry onto the first cover sheet.

In one embodiment of the present invention, a part of the hemihydrate main stream, for example 85% by weight, is directly fed into the mixer without addition of additives. The purpose of this is to reduce the water demand and agglomeration of fine particles. The second part of the gypsum main stream, for example 15% by weight, is fed through the component conveyor screw. Into this stream the powdery additives or components, i.e. in particular the mixture of the active pore-building mixture with PVA, preferably composed of 80% PVA, 10% of organic acid and 10% of calcium carbonate (as described above), are dosed preferably via a volumetric dosing device.

It is to be understood that in the above-described processes according to the present invention further process steps that are commonly used in the prior art for such processes are not described but may be done, of course in the context of the present invention.

While it is possible, in one preferred embodiment of the present invention, the acoustic panels of the present invention are not subjected to a surface treatment or texturing, e.g. no embossing steps or such are performed on the panels during production.

Additionally, the present invention is directed to a process for regulating foaming quantity and setting of hemihydrate water mixtures during production of panels of a gypsum-based core layer encased in cover sheets by controlled addition of an active pore-building mixture comprising of an organic acid and calcium carbonate to the hemihydrate mixture to be formed.

It is to be noted that the exact features and properties of the compounds to be employed in the processes of the present invention are not always repeated in the context of the processes, as long as they have already been described in the context of the acoustic panels according to the present invention, where they are not repeated, it is to be understood that those described in the context of the acoustic panels according to the invention are to be employed—and vice versa. In the case of deviations, the ones described in the respective context take precedence.

The panels of the present invention can advantageously be installed in objects/rooms wherein the acoustic properties should be improved or optimized, as with the panels according to the present invention, sound is specifically absorbed, whereby less sound is reflected. Thus, the sound reverberation times are also reduced.

The panels of the present invention are particularly suitable for application as an acoustic, carrier or wall panel for rooms, in particular ceilings. In this case it is possible to cover the acoustic panels according to the invention with plaster, filler or (wall-)paint, in which case it is particularly advantageous and a further preferred embodiment of the present invention if the plaster, filler or paint is an acoustically transparent plaster, filler or paint. In these embodiments, the filler can in some embodiments be a two-part filler made of a basic coat and a top coat. The panels of the present invention can also be used for/in suspended ceilings, coffered ceilings, insert ceilings.

The panels of the present invention can be used as part of a system-solution that can be offered to customers for optimising acoustical properties, particularly for reducing reverberation time, comprising at least the acoustic panel of the present invention as a separate acoustic element, ceiling element or wall panel, optionally with a coating, in particular a sound absorbing coating.

It should be understood that the panels of the present invention and the processes of the present invention are interconnected. This means that effects and facts explained with regard to the one also applies to the other as long as that makes sense and does not create contradictions.

It should further be understood that the respective features outlined above and in the claims can be combined in any suitable manner, as long as that makes sense and does not create contradictions.

In the following the invention is additionally described with reference to the figures. The figures are not necessarily true to scale and simplified. As such, features readily know to the person skilled in the art are not necessarily shown (like screws, valves, mixers, cutters, connections of the respective devices, exact configuration of known devices and such) in order to enhance the intelligibility and clarity of the figures. The invention, however, is not to be reduced to the figures, which are understood to be illustrative.

FIG. 1 is an illustration of how the acoustic sound damping with the acoustic panels of the present invention works. Here, a ceiling panel of a room is depicted with ambient air above the panel. The panel is illustrated by two thick horizontal lines representing the face side and the back side (cover sheets). The closed circles illustrate gypsum particles and the spaces in between the closed circles illustrate the channels and cavities of the foamed structure.

It should be understood that this is an idealised depiction and the actual gypsum particles, channels and cavities in reality are not that orderly and far more irregular. Typically, sharp edges predominate over smooth and round structures.

An impinging sound wave from the lower left (the length of the arrow depicts the direction of travel of the sound wave, whereas the intensity of the sound wave is depicted by the concentric circle segments) is partly reflected at the face side surface, which is illustrated by the dashed arrows at the bottom. The part of the soundwave entering into the porous core layer can no longer travel straight, but has to follow the various channels and cavities. This leads to a spread of the sound in virtually all directions. During this process, a significant amount of the sound is converted to heat energy, which reduces the sound energy in the gypsum core layer. Thus, the portion of the initial soundwave that reaches the inner back side cover sheet (on which, again a part is reflected) is greatly reduced. Therefore, only a highly reduced soundwave is transmitted through the panel and escapes through the back side, which is illustrated by the much shorter arrow.

Figure 2:
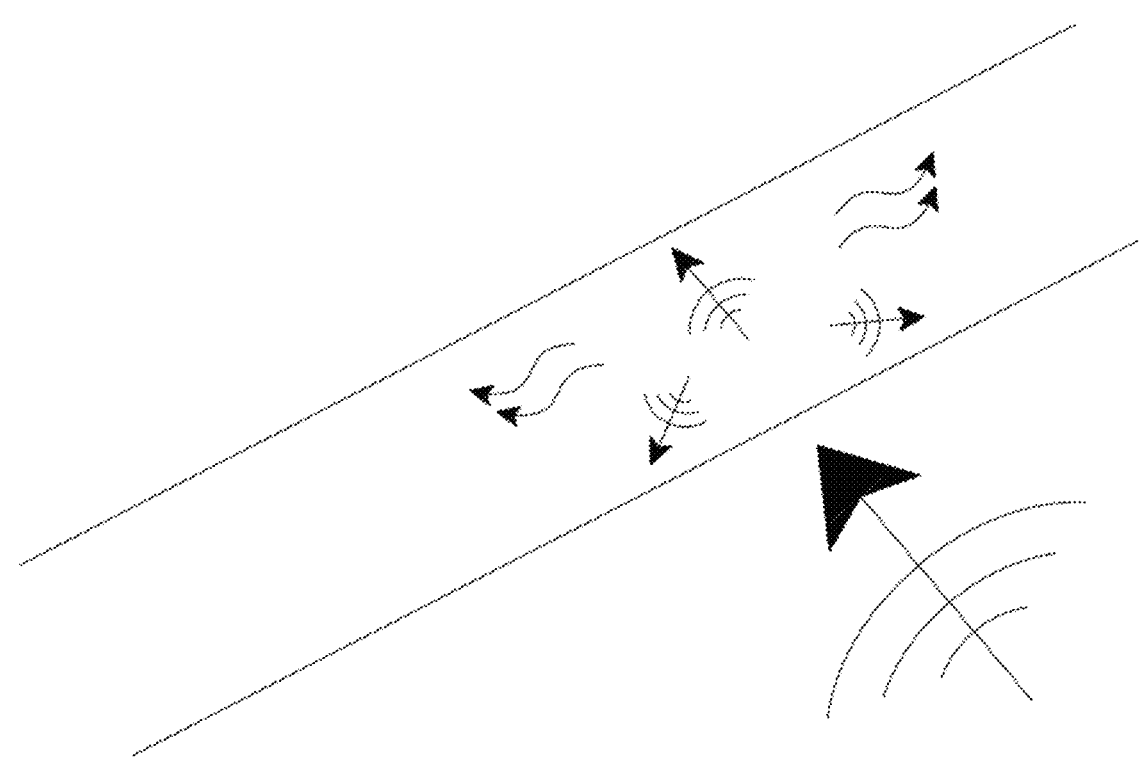
FIG. 2 shows a soundwave entering the present acoustic panel.

FIG. 2 is another, more simplified version of the working principle of the present invention. A soundwave is shown coming from the lower right towards the acoustic panel. Upon entering through the face side cover sheet, formed from a non-woven, into the porous core layer of the panel, the sound is spread in several directions and thus both the intensity of the sound being reflected and also the sound being able to reach the ambient air through the back side of the panel are greatly reduced.

Figure 3:
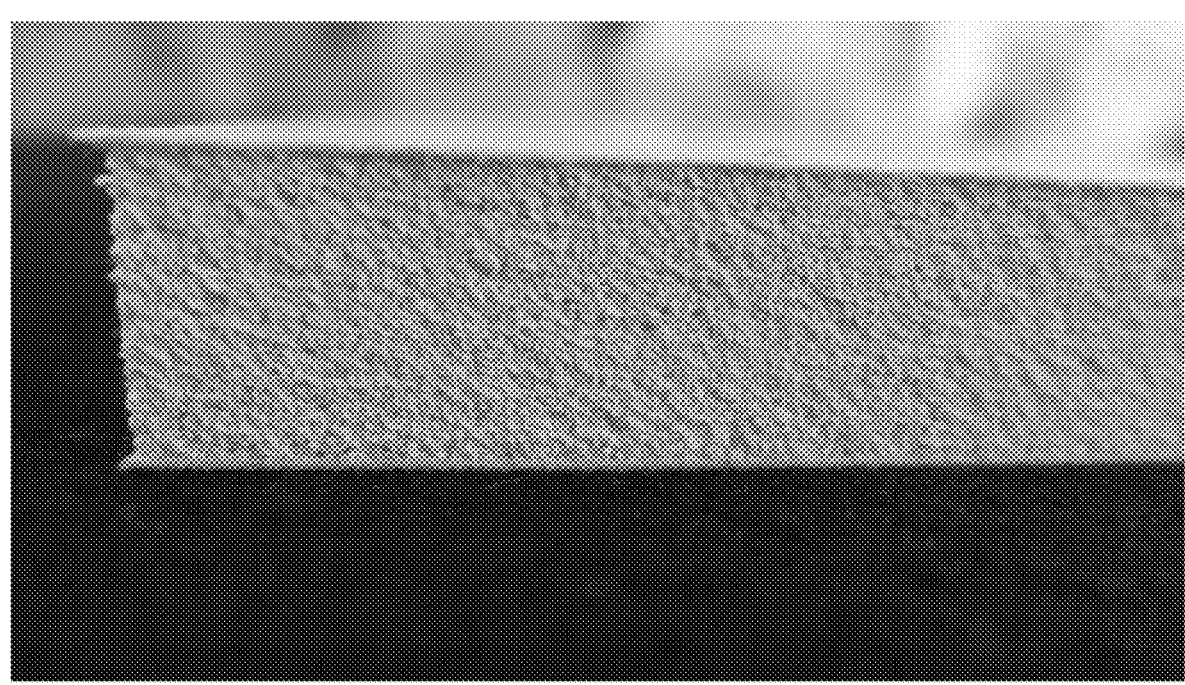
FIG. 3 shows a cut through of the present acoustic panel.

FIG. 3 is a side-view photograph of a cut through an acoustic panel according to the present invention. The monolithic foamed structure of gypsum can be seen between the face and backside cover sheets that were made from the glass fibre/polyester fibre composite non-woven.

Figure 4:
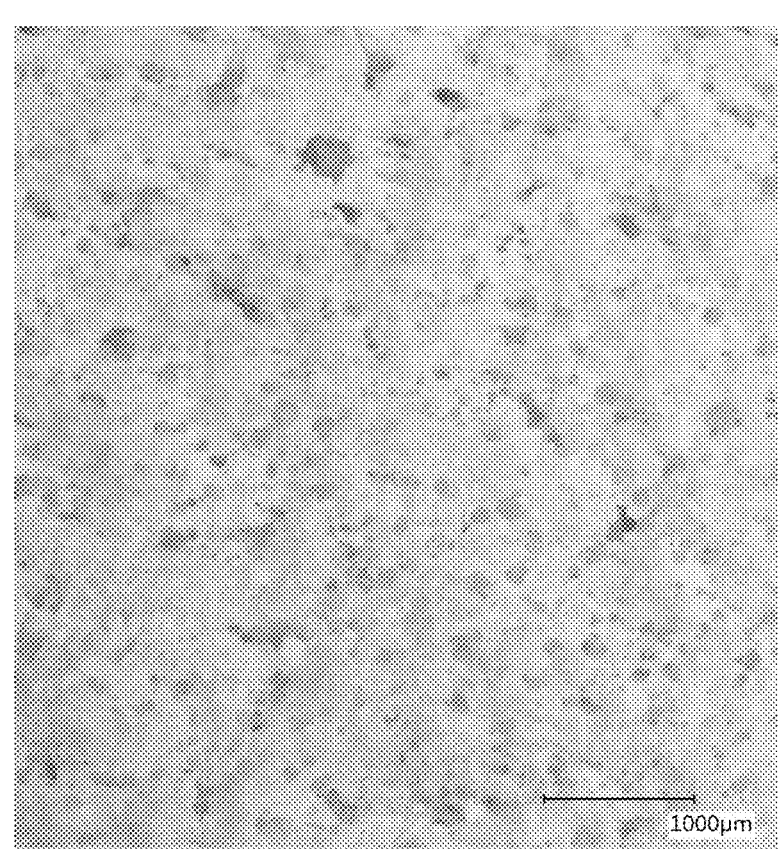
FIG. 4 shows a micrograph of a core layer of the present acoustic panel.
Figure 5:
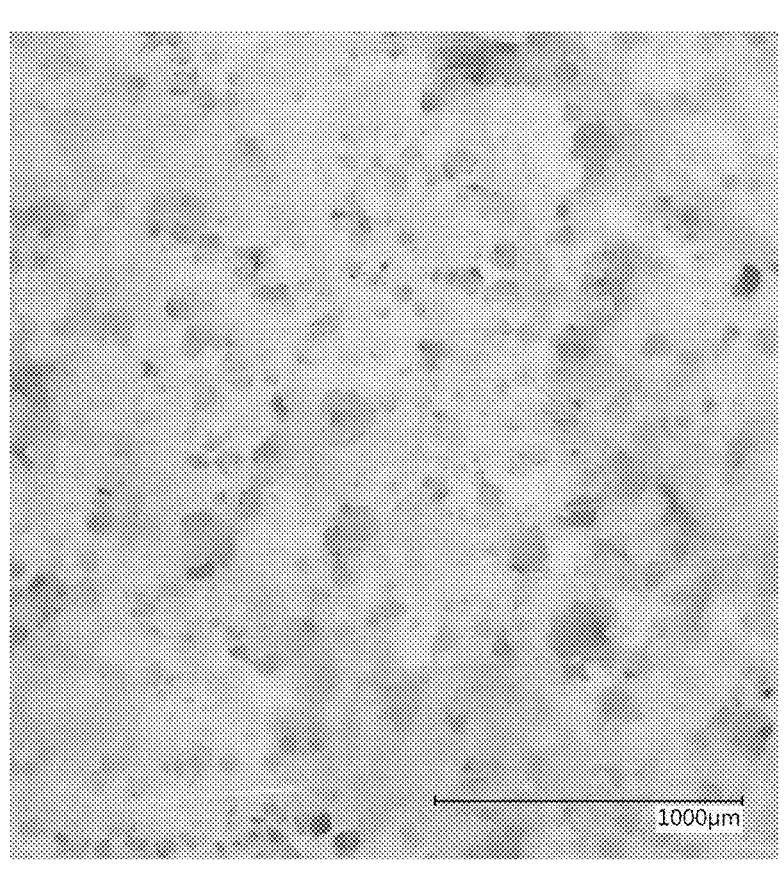
FIG. 5 shows a magnified micrograph of a core layer of the present acoustic panel.

FIGS. 4 and 5 show micrographs of a core layer according to the invention. FIG. 4 shows a 50-fold magnification, while FIG. 5 depicts a 100-fold magnification. For comparative purposes, both micrographs include a bar representing 1000 μm. An extensive network of pores and channels runs through the gypsum matrix. Compared to other lightweight gypsum panels, the pores of the inventive panels are smaller and shaped irregularly.

The invention is now described in more detail with reference to the following non-limiting examples. The following exemplary, non-limiting examples are provided to further describe the embodiments presented herein. Those having ordinary skill in the art will appreciate that variation of these examples are possible within the scope of the invention.

EXAMPLES

Five different acoustic panels with a gypsum core layer and a non-woven cover sheets on the face and back sides were prepared in accordance with a process according to the present invention.

Key data and production parameters:

panel size: 2000*1250*20 mm encasing material: glass fibre/polyester composite non-woven The basic composition of for the gypsum was in any case the same and comprised 47% of titanogypsum, 28% of citrogypsum and 25% of FGD gypsum.

Polyvinyl alcohol, calcium carbonate and tartaric acid were employed as pre-mixed additive compounds in each case.

TABLE 1

| parameter | unit | No. 01 | No. 02 | No. 03 | No. 04 | No. 05 |
|---|---|---|---|---|---|---|
| nominal thickness | mm | 20 | 20 | 20 | 20 | 20 |
| non-woven (face) | — | blend of glass fibres and polyester fibres | | | | |
| non-woven (back) | — | blend of glass fibres and polyester fibres | | | | |
| foam concentrate | — | anionic surfactant | | | | |
| glass fibres[1] | g/m$^2$ | 110 | 110 | 110 | 110 | 110 |
| Polyvinyl alcohol | % | 2.0 | 2.0 | 2.0 | 2.0 | 2.0 |
| calcium carbonate (<63 μm) | % | 0.25 | — | — | — | — |
| calcium carbonate (<100 μm) | % | — | 0.25 | 0.25 | 0.25 | 0.25 |

TABLE 1-continued

| parameter | unit | No. 01 | No. 02 | No. 03 | No. 04 | No. 05 |
|---|---|---|---|---|---|---|
| L(+)-tartaric acid | % | 0.25 | 0.25 | 0.25 | 0.25 | 0.25 |
| square meter weight | kg/m$^2$ | 7.11 | 7.04 | 6.82 | 7.13 | 6.58 |
| density | kg/m$^3$ | 358 | 355 | 342 | 352 | 331 |
| measured thickness | mm | 19.88 | 19.80 | 19.94 | 20.27 | 19.87 |
| Rs | Pa s/m | 10502 | 10608 | 10192 | 12304 | 7760 |
| alpha$_w$-value | | 0.55 | 0.55 | n.d. | 0.50 | 0.60 |
| specific flexural strength[2] | N/mm$^2$ | 1.98 | 2.03 | 2.25 | 2.79 | 2.06 |
| | | 1.79 | 1.93 | 2.04 | 2.54 | 1.97 |
| | | 2.21 | 2.16 | 2.39 | 3.06 | 2.19 |
| specific flexural strength[3] | N/mm$^2$ | 1.73 | 1.83 | 1.85 | 2.49 | 1.71 |
| | | 1.44 | 1.71 | 1.64 | 1.99 | 1.45 |
| | | 2.02 | 1.93 | 2.04 | 2.89 | 1.97 |
| Young's modulus[4] | N/mm$^2$ | 521 | 523 | 553 | 637 | 534 |
| | | 452 | 494 | 505 | 596 | 523 |
| | | 587 | 550 | 589 | 675 | 544 |
| Young's modulus[5] | N/mm$^2$ | 401 | 411 | 409 | 553 | 398 |
| | | 335 | 393 | 373 | 492 | 377 |
| | | 462 | 418 | 454 | 611 | 427 |
| adhesive tensile strength[6] | N/mm$^2$ | 0.14 | 0.14 | 0.16 | 0.19 | 0.16 |
| | | 0.12 | 0.13 | 0.13 | 0.17 | 0.14 |
| | | 0.16 | 0.16 | 0.18 | 0.30 | 0.18 |
| adhesive tensile strength[7] | N/mm$^2$ | 0.16 | 0.14 | 0.18 | 0.25 | 0.15 |
| | | 0.14 | 0.12 | 0.16 | 0.17 | 0.13 |
| | | 0.19 | 0.16 | 0.20 | 0.30 | 0.17 |

The foam concentrate is a blend of anionic surfactant (35%) in water (65%)
[1]= glass fibres from Johns Manville J.M. M300-13
Rs = specific flow resistivity (with non-woven) according to EN ISO 9053-1/EN 29053
alpha$_w$-value determined according to DIN EN ISO 11654
n.d. = not determined
[2]face side, lengthwise, sigma$_{Fmax}$, according to EN 15283-1:2009/DIN 18180, values are (from top) average, minimum and maximum
[3]= back side, crosswise, dto
[4]= face side, lengthwise, according to EN 15283-1:2009/DIN 18180, dried at 40° C., values are (from top) average, minimum and maximum
[5]= back side, crosswise, dto
[6]= face side, according to EN 13963:2014, values are (from top) average, minimum and maximum
[7]= back side, dto Additionally, in the sound testing, all the samples achieved the additional designation "H" for particularly high absorption of high frequencies.

As is apparent from the above table, the acoustic panels prepared show a very good balance of good acoustic properties and at the same time mechanical properties.

As can be seen examples 1 to 4 can be assigned to absorber class "D", i.e. absorbing and example 5 to absorber class "C", i.e. highly absorbing. At the same time, example 5 has the lowest specific flow resistivity.

While a particular embodiment of a gypsum-based acoustic panel has been described herein, it will be appreciated by those skilled in the art that changes and modifications may be made thereto without departing from the invention in its broader aspects and as set forth in the following claims.

The invention claimed is:

1. A gypsum-based acoustic panel wherein in the panel comprises:

a core layer of foamed gypsum;

a first and a second cover sheet encasing the core layer;

the panel has an alphaw-value of between 0.4 and 0.7 and a specific flow resistance of <15000 Pa s/m according to DIN EN 29053:1993; and the gypsum contains fibres in an amount of up to 1.0 to 2.0% by weight in relation to amount of gypsum.

2. The gypsum based acoustic panel according to claim 1, characterized in that the first and second cover sheet are non-wovens.

3. The gypsum based acoustic panel according to claim 1, characterized in that before setting the gypsum comprises a hemihydrate mixture consisting of:

32 to 62% of titanogypsum;

13 to 43% of citrogypsum and 10 to 40% of FGD gypsum;

the percentages being by weight and based on the entire hemihydrate mixture and adding up to 100%.

4. The gypsum based acoustic panel according to claim 1, characterized in that the acoustic panel contains an organic calcium salt, in the range of 0.20 to 0.30% by weight, based on the entire amount of gypsum in each case, and/or polyvinyl alcohol in the range of 1.5 to 2.5% by weight, based on the entire amount of gypsum in each case.

5. A use of the acoustic panel according to claim 1 for suspended ceilings, coffered ceilings, insert ceilings, as separate acoustic element, ceiling elements or wall panel for rooms, as part of a system-solution to optimize acoustical properties, and to reduce the reverberation time in rooms.

6. The gypsum based acoustic panel according to claim 1, characterized in that the fibres are selected from the group consisting of glass fibres, carbon fibres, mineral fibres, basalt fibres, cellulose fibres, fibres or synthetic organic polymer and mixtures thereof.

7. The gypsum based acoustic panel according to claim 1, characterized in that it has a density of <450 kg/m$^3$.

8. The gypsum based acoustic panel according to claim 1, characterized in that it has the following set of properties and features:

alphaw-values of up to 0.6;

specific flow resistance of <15000 Pa s/m according to DIN EN 29053:1993;

density of <450 kg/m$^3$;

the gypsum is encased with a non-woven;

a thickness of 20 mm ±0.7 mm;

a square meter weight of <7.5 kg/m²;

the employed gypsums/hemihydrates have a purity of at least 90% by weight;

an amount of 1.5 to 2.5% by weight of polyvinyl alcohol, based on the entire amount of employed gypsum;

glass fibres having chopped strands lengths of between 5 mm and 15 mm and filament diameters of between 13 μm and 17 μm;

the surface is optionally neither holed nor perforated;

pore sizes of the core layer in the range of 20 μm to 300 μm; and the amount of pores is within the range of 40 to 60% by volume.

9. The gypsum based acoustic panel according to claim 1, characterized in that the acoustic panel is structured, and covered with a further layer of non-woven.

10. A process for preparing a gypsum based acoustic panel having an alphaw-value of between 0.4 and 0.7 and a specific flow resistance of <15000 Pa s/m according to DIN EN 29053:1993 comprising of the following steps:

I) providing beta-hemihydrate from a synthetic gypsum source;

II) mixing the compound of I) with water to provide a slurry;

III) mixing an active pore-forming compound comprising 0.1 to 5.0% by weight of an organic acid and 0.1 to 10.0% by weight of a carbonate with the compound of I) or the slurry of II) and/or mixing a surfactant-based foam with the slurry of II) to provide a foamed slurry;

IV) applying the resulting foamed slurry to a first cover sheet, made of non-woven;

V) applying a second cover sheet, made of non-woven, to the foamed slurry opposite to the side of the first cover sheet;

VI) drying the product of VI) to obtain an acoustic panel;

wherein the foamed slurry has a slump test value of between 155 and 190 mm and slurry-litre weight of between 520 and 580 g/l;

wherein during and after the application of the foamed slurry no distributor roller is used; and the foamed slurry is distributed by vibration.

11. A process for preparing a gypsum based acoustic panel having an alphaw-value of between 0.4 and 0.7 and a specific flow resistance of <15000 Pa s/m according to DIN EN 29053:1993 comprising of the following steps:

I) providing beta-hemihydrate from a synthetic gypsum source;

II) mixing the compound of I) with water to provide a slurry;

III) mixing an active pore-forming compound comprising 0.1 to 5.0% by weight of an organic acid and 0.1 to 10.0% by weight of a carbonate with the compound of I) or the slurry of II) and/or mixing a surfactant-based foam with the slurry of II) to provide a foamed slurry;

IV) applying the resulting foamed slurry to a first cover sheet, made of non-woven;

V) applying a second cover sheet, made of non-woven, to the foamed slurry opposite to the side of the first cover sheet; and VI) drying the product of VI) to obtain an acoustic panel;

wherein the foam generation is started:

i) before entering the mixer, with aid of surfactant;

ii) upon entering of dry components, via a component screw, into the mixer; or i) before entering the mixer and upon entering of dry components into the mixer.

12. The process according to claim 10, wherein the foam generation is started:

i) before entering the mixer, with aid of surfactant;

ii) upon entering of dry components, preferably via a component screw, into the mixer; or iii) before entering the mixer and upon entering of dry components into the mixer.

13. The process according to claim 10, characterized in that an accelerator is added to the mixture in step II), and the accelerator is based on a calcium sulphate dihydrate.

14. A use of the acoustic panel prepared according to the process of claim 10 for suspended ceilings, coffered ceilings, insert ceilings, as separate acoustic element, ceiling elements or wall panel for rooms as part of a system-solution to optimize acoustical properties, and to reduce the reverberation time in rooms.

\* \* \* \* \*